E. SEARS.
LUBRICATING SYSTEM.
APPLICATION FILED SEPT. 26, 1914.
1,165,719.
Patented Dec. 28, 1915.
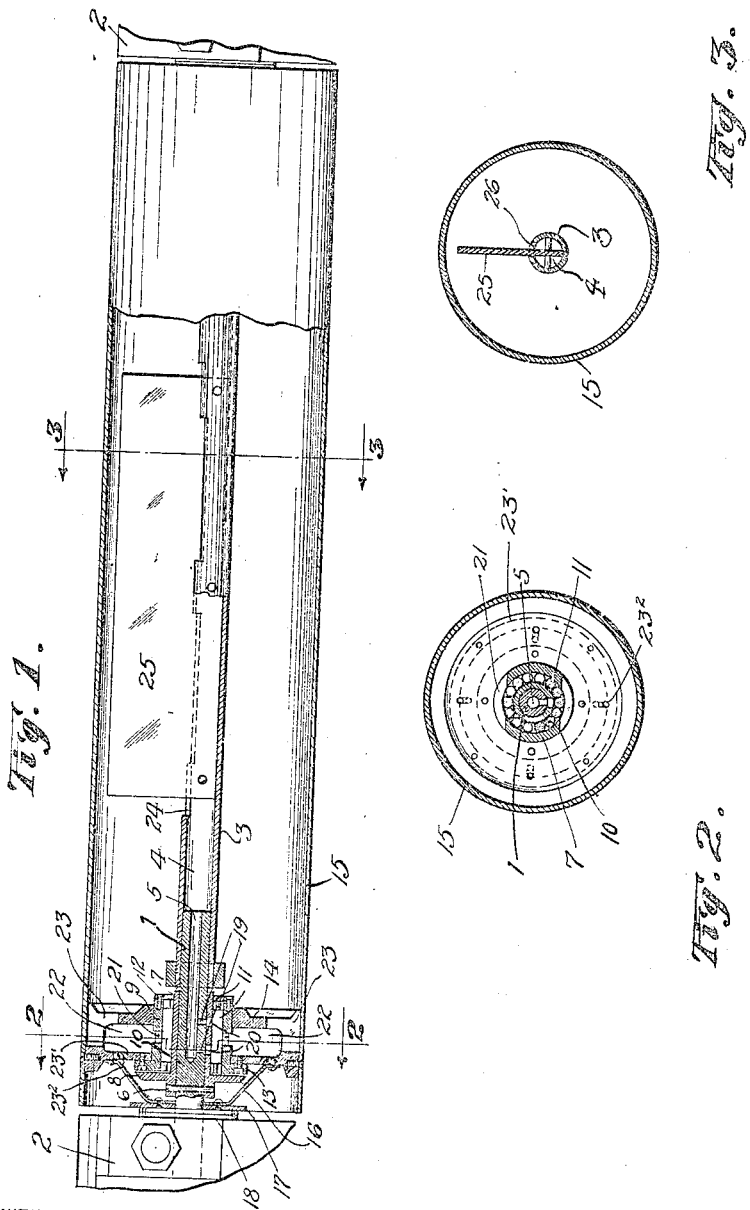

UNITED STATES PATENT OFFICE.

EDWARD SEARS, OF BEAVERTON, OREGON.

LUBRICATING SYSTEM.

1,165,719.  Specification of Letters Patent.  Patented Dec. 28, 1915.

Application filed September 26, 1914. Serial No. 863,692.

*To all whom it may concern:*

Be it known that I, EDWARD SEARS, a citizen of the United States, residing at Beaverton, in the county of Washington and State of Oregon, have invented certain new and useful Improvements in Lubricating Systems, of which the following is a specification.

The present invention relates to improvements in lubricating systems for rotating bodies generally, and more particularly for use in connection with pantograph rollers adapted for use in collecting current for the operation of electric cars or the like, and the invention has for its principal objects to provide a structure which is self lubricating; one wherein the lubricating fluid is maintained in circulation at all times when the body is rotating, and by the employment of which a greater efficiency is obtained than with the structures at present employed; and one wherein the inspection and maintenance cost are considerably reduced over the structures now employed.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention reference is directed to the accompanying drawings wherein, for purpose of illustration, my invention is disclosed in connection with a pantograph roller and in which—

Figure 1 is a longitudinal sectional view of a pantograph roller employing my invention. Fig. 2 is a transverse sectional view taken on line 2—2 of Fig. 1, looking in the direction of the arrow. Fig. 3 is a transverse sectional view taken on line 3—3 looking in the direction of the arrow.

Referring more particularly to the drawings, wherein like characters of reference indicate corresponding parts throughout the several views, the numeral 1 designates a suitable supporting stub shaft, one being employed at each end of the structure, and the shafts are supported at one end by the beads 2, and are connected at their opposite ends by the shaft 3, collared at its ends and formed with a longitudinal chamber 4 which connects with a bore 5 in the stub shafts 1.

Retained on each of the stub shafts 1 by a pin 6 is a thrust bearing 7 formed at one end with an annular thrust flange 8, and surrounding said thrust bearing is a bearing box 9, between which and the thrust bearing are interposed the roller bearings 10, carried by spacers 11, said bearings being retained in the bearing box by the removable plates 12 detachably secured over the end of the boxes.

The bearing boxes are each formed at one end with an annular flange 13 which coöperates with the annular thrust flanges 8 and secured to each of said flanges 13 is an annular hub 14 which carries the roller shell or drum 15. The roller shell or drum 15 is adapted to contain a quantity of fluid lubricant.

Suitable annular cup shaped end caps 16 are connected at their peripheral edges to the hubs 14 and said caps surround the stub shafts 1 and each carry a suitable shunt bearing 17 which lies in contact with the shunt 18 carried by the respective beads 2. The current collected by the roller shell or drum 15 from the wire, not shown, is conducted to the shunts 18 through the flanges 13 and 8, and the hubs 14, end caps 16, and shunt bearings 17.

Suitable ports 19 formed in the under portion of the stub shafts 1 connect the inner ends of the channels 5 thereof with suitable registering ports 20 formed in the thrust bearing 7. The bearing boxes 9 are formed with suitable ports 21 which communicate with the annular chambers 22, formed in the hubs 14. Channels 23 are formed in the outer portions of the hubs 14 and provide a passage between the chambers 22 and the interior of the roller shell or drum 15, and the walls 23' of the hubs are formed with inclined passages 23². The upper edge of said shaft 3 is slotted longitudinally, as at 24, and mounted in said slot is a vertically disposed baffle or collector plate 25, which, on the rotation of the shell or drum 15 in either direction, interrupts the film of lubricant carried by the inner surface of the shell or drum and the lubricant collected by the plate flows downwardly thereon and into the chamber 4 of the shaft 3 through the cut out portions 26 on either side of the plate—as in Fig. 1.

During the rotation of the roller shell or drum at high speed, the lubricant directed by the plate 25 into the chamber 4 flows into the bores 5, through the ports 19 and 20 onto the rollers 10, lubricating the same, and thence flows outwardly into the ports 21 and from there is forced by the rotation of the hub into the chamber 22 and through the channels 23 into the roller shell or drum 15, from which place it is again picked up by the plate 25. When the roller shell or drum is rotating at a slow speed, the lubricant passes into the chamber 22, through the channels 23, from which it flows through the ports 21, lubricating the rollers 10. Lubricant which passes between the flanges 13 and 8 is returned to the chamber 22 through the passages 23², and is thus prevented from passing between the shafts 1 and shunts 17.

It will be apparent that I have provided a lubricating system for rotating bodies wherein there is maintained at all times during the rotation of the body a continuous flow of lubricant from the reservoir to the body bearing and back to the reservoir.

My improved system is equally as well adapted for use in connection with sheaves, belt supporting drums or the like, as it is for the pantograph roller construction employed for purposes of illustration.

Having thus described my invention what I claim as new and desire to protect by Letters Patent is:—

1. In a device of the class described, the combination with a tubular supporting shaft formed with a fluid inlet and a fluid outlet, a hub rotatably mounted on said shaft over said fluid outlet and formed with a radially disposed channel therein communicating with the interior of the hub, and a shell carried by said hub and adapted to contain a quantity of fluid lubricant, the interior chamber of said shell being in communication with said radially disposed channel in said hub.

2. In a device of the class described, the combination with a tubular supporting shaft formed with a fluid inlet and a fluid outlet, a hub rotatably mounted on said shaft over said fluid outlet, and a radially disposed open ended channel therein, a hollow member carried by said hub and adapted to contain a quantity of fluid lubricant, bearings interposed between the hub and said shaft, and a baffle in said fluid inlet and projecting outwardly from said shaft.

3. An oiling system for rotary bodies comprising a tubular supporting shaft formed with a fluid inlet and a plurality of fluid outlets, supporting hubs rotatably mounted on said shaft over said fluid outlets, and each formed with a radially disposed open ended channel therein, the outer ends of said channels opening at adjacent sides of the respective hubs, a tubular member carried by and closed at its ends by said hubs and adapted to contain a quantity of fluid lubricant, bearings interposed between said hubs and shaft, and a baffle in said fluid inlet and projecting outwardly from said shaft.

4. A lubricating system for the described purpose, the same comprising a rotatable shell provided with an interior fluid containing chamber, a shaft within said chamber provided with an interior fluid circulating chamber and a longitudinally disposed slot in the upper wall thereof communicating with the circulating chamber, said shaft also provided with a fluid outlet extending therefrom, a hub rotatably mounted on said shaft over said fluid outlet and fixed within the interior of the said shell, said hub being formed with a radially disposed channel having its ends in registry respectively with said fluid outlet and the said fluid containing chamber, and a baffle fixed to said shaft and extending upwardly therefrom to direct the fluid into the longitudinally disposed slot thereof.

5. A lubricating system for the described purpose comprising a rotatable shell provided with an interior fluid containing chamber, a hollow shaft within said chamber, provided with an inlet in the wall thereof communicating with the interior of the chamber and a fluid outlet, a hub rotatably mounted on said shaft, fixed to said shell, and formed with radially disposed channels communicating at their inner ends with the interior bearing surface of said hub and at their outer ends with the said fluid containing chamber, bearings interposed between said hub and said shaft for maintaining the relative radial and axial positions thereof, and means carried by the said shaft for directing fluid therein through its inlet opening.

6. A lubricating system for rotary bodies comprising a fixed supporting shaft provided with a central longitudinal circulating chamber having an axially disposed fluid inlet and radially disposed fluid outlets, a hub rotatably mounted upon said shaft over said fluid outlets, said hub being formed with a radially disposed open ended channel, a hollow member carried by said hub and adapted to contain a quantity of fluid lubricant, and means for directing a flow of the lubricant contained therein into said axially disposed fluid inlet of the supporting shaft.

7. A lubricating system for rotary bodies comprising a pair of fixed alined supporting shafts provided with central longitudinal circulating chambers having axially disposed fluid inlets at their adjacent ends and radially disposed fluid outlets, supporting hubs rotatably mounted on said shafts over said fluid outlets, and each formed with a radially disposed open ended channel therein, the outer ends of said channels opening at adjacent sides of the respective hubs, a tubular member carried by and closed at its ends by said hubs and adapted to contain a quantity of fluid lubricant, and means within said tubular member for introducing the fluid lubricant contained therein into the said axially disposed fluid inlets of the chambered axle shafts.

8. A lubricating system for rotary bodies comprising a pair of fixed alined supporting shafts provided with central longitudinal circulating chambers having axially disposed openings at their adjacent ends and radially disposed fluid outlets, a tubular shaft connecting the adjacent ends of said supporting shafts, and provided with fluid inlet openings in the peripheral wall thereof, supporting hubs rotatably mounted on said shafts over said fluid outlets, and each formed with a radially disposed open ended channel therein, the outer ends of said channels opening at adjacent sides of the respective hubs, a hollow member carried by and closed at its ends by said hubs and adapted to contain a quantity of fluid lubricant, and means within said hollow member for directing a flow of the fluid contained therein into the said fluid inlet openings in the tubular connecting shaft.

9. A lubricating system for the described purpose comprising a fixed tubular shaft provided for a portion of its length with a bearing surface, a shoulder adjacent to said bearing surface, a fluid outlet opening from the interior chamber at said bearing surface, and a fluid inlet opening at another place in said shaft; a hub rotatably mounted on the bearing surface of said shaft, and provided with a radially disposed channel leading from the inner bearing surface of the hub to an outlet near the periphery thereof, an axial bearing surface on the face of said hub to engage the shoulder on said shaft, an annular extension from the face of the hub to inclose the said axial bearing, and a fluid outlet opening in said face to transfer fluid from within said annular extension to the radially disposed channel of said hub; a shell carried by said hub, surrounding the said tubular shaft, and forming a fluid containing chamber, said chamber being in communication with the fluid inlet opening in said shaft and the outer end of the radially disposed channel in said hub; and means within said chamber for inducing a circulation of the fluid therein contained through the respective channels of said shaft and said hub.

In testimony whereof I have signed my name to this specification in the presence of two subscribing witnesses.

EDWARD SEARS.

Witnesses:
W. E. BOND,
PAUL LEBENBAUER.